US010821702B2

United States Patent
Schoenfelder (10) Patent No.: US 10,821,702 B2
(45) Date of Patent: Nov. 3, 2020

(54) TEXTILE COMPOSITE MATERIAL FOR LAMINATION, COMPRISING A NONWOVEN FABRIC COMPONENT AND A FOAM MATERIAL COMPONENT

(71) Applicant: J.H. Ziegler GmbH, Achern (DE)

(72) Inventor: Steffi Schoenfelder, Sasbach (DE)

(73) Assignee: J.H. Ziegler GmbH, Achern (DE)

( * ) Notice: Subject to any disclaimer, the term of this patent is extended or adjusted under 35 U.S.C. 154(b) by 9 days.

(21) Appl. No.: 15/525,325

(22) PCT Filed: Oct. 23, 2015

(86) PCT No.: PCT/EP2015/074621
§ 371 (c)(1),
(2) Date: May 9, 2017

(87) PCT Pub. No.: WO2016/074908
PCT Pub. Date: May 19, 2016

(65) Prior Publication Data
US 2017/0313023 A1    Nov. 2, 2017

(30) Foreign Application Priority Data
Nov. 10, 2014 (DE) .................. 10 2014 116 356

(51) Int. Cl.
*B32B 5/22* (2006.01)
*B32B 5/18* (2006.01)
(Continued)

(52) U.S. Cl.
CPC .................. *B32B 5/22* (2013.01); *A47C 7/24* (2013.01); *B32B 5/022* (2013.01); *B32B 5/08* (2013.01);
(Continued)

(58) Field of Classification Search
CPC .. B60N 2/58; A47C 7/24; B32B 5/022; B32B 5/018; B32B 5/245; B32B 7/12; B32B 2601/00
(Continued)

(56) References Cited

U.S. PATENT DOCUMENTS 3,352,739 A * 11/1967 Blue .................. B29C 66/00
156/148
3,451,885 A * 6/1969 Klein .................. B32B 5/022
156/148
(Continued)

FOREIGN PATENT DOCUMENTS

DE        9415040 U1    10/1995
DE        19845735 A1    4/2000
(Continued)

OTHER PUBLICATIONS

Search Report dated Aug. 11, 2015 issued in corresponding DE patent application No. 10 2014 116 356.7 (and partial English translation).
(Continued)

*Primary Examiner* — Jennifer A Gillett
(74) *Attorney, Agent, or Firm* — Posz Law Group, PLC (57) ABSTRACT

A textile composite material for lamination includes: a total material thickness which is smaller than 7 mm, with at least one nonwoven fabric component and with at least one foam material component which is connected to the nonwoven fabric component, the nonwoven fabric component comprises at least one binder fiber having a melting temperature that is greater than 150° C., the nonwoven fabric component comprises at least one functional fiber having a linear mass density value smaller than or equal to 50 dtex, and the functional fiber is embodied as a hollow fiber.

15 Claims, 1 Drawing Sheet

(51) Int. Cl.
  *B32B 7/12* (2006.01)
  *B32B 5/02* (2006.01)
  *B32B 5/24* (2006.01)
  *B60N 2/58* (2006.01)
  *B32B 5/08* (2006.01)
  *A47C 7/24* (2006.01)
  *B32B 5/06* (2006.01)

(52) U.S. Cl.
  CPC ............ *B32B 5/18* (2013.01); *B32B 5/245* (2013.01); *B32B 7/12* (2013.01); *B60N 2/58* (2013.01); *B60N 2/5891* (2013.01); *B32B 5/06* (2013.01); *B32B 2262/0223* (2013.01); *B32B 2262/0238* (2013.01); *B32B 2262/0246* (2013.01); *B32B 2262/0253* (2013.01); *B32B 2262/0261* (2013.01); *B32B 2262/0292* (2013.01); *B32B 2262/067* (2013.01); *B32B 2262/14* (2013.01); *B32B 2266/0214* (2013.01); *B32B 2266/0264* (2013.01); *B32B 2266/0278* (2013.01); *B32B 2307/718* (2013.01); *B32B 2307/72* (2013.01); *B32B 2309/105* (2013.01); *B32B 2601/00* (2013.01); *B32B 2605/003* (2013.01)

(58) Field of Classification Search
  USPC .......................... 442/370, 338; 297/452.48
  See application file for complete search history.

(56) References Cited

U.S. PATENT DOCUMENTS

| | | | | |
|---|---|---|---|---|
| 5,298,321 | A * | 3/1994 | Isoda | D02G 1/14 |
| | | | | 428/362 |
| 5,882,794 | A * | 3/1999 | Hernandez | D02G 3/00 |
| | | | | 428/376 |
| 6,102,482 | A * | 8/2000 | Dettoni | A47C 7/16 |
| | | | | 297/440.11 |
| 6,394,542 | B2 * | 5/2002 | Potisch | A47C 7/40 |
| | | | | 297/182 |
| 2002/0122937 | A1 * | 9/2002 | Sudo | D01D 5/247 |
| | | | | 428/364 |
| 2004/0103970 | A1 | 6/2004 | Quedemi et al. | |
| 2005/0266230 | A1 * | 12/2005 | Hill | A47L 13/16 |
| | | | | 428/317.9 |
| 2008/0008862 | A1 * | 1/2008 | Ogle | A47G 27/0468 |
| | | | | 428/159 |
| 2013/0157551 | A1 * | 6/2013 | Endo | B24D 11/00 |
| | | | | 451/532 |
| 2014/0273705 | A1 * | 9/2014 | Lawrence | B32B 5/18 |
| | | | | 442/370 |

FOREIGN PATENT DOCUMENTS

| | | |
|---|---|---|
| DE | 202009015059 U1 | 1/2010 |
| EP | 1039005 A1 | 9/2000 |
| EP | 2853628 A1 | 4/2015 |
| JP | 5425352 B1 | 12/2013 |
| WO | 2014/150336 A2 | 9/2014 |

OTHER PUBLICATIONS

International Search Report of the International Searching Authority dated Jan. 19, 2016 issued in corresponding International Patent Application No. PCT/EP2015/074621.

International Preliminary Report on Patentability dated May 11, 2017 issued in corresponding International Patent Application No. PCT/EP2015/074621 (and German version of Nov. 29, 2016 with Article 34 amendments).

Office action dated Jul. 3, 2018 issued in corresponding CN patent application No. 107107531 (and English translation thereof).

\* cited by examiner

TEXTILE COMPOSITE MATERIAL FOR LAMINATION, COMPRISING A NONWOVEN FABRIC COMPONENT AND A FOAM MATERIAL COMPONENT

CROSS REFERENCE TO RELATED APPLICATIONS

This application is a U.S. national stage application of PCT/EP2015/074621 filed on Oct. 23, 2015, which claims priority to German Patent Application No. DE 10 2014 116 356.7 filed on Nov. 10, 2014, the contents of which are incorporated herein by reference.

STATE OF THE ART

The invention relates to a textile composite material for lamination.

From WO 2014/150336 A2 a textile composite material for lamination is already known, which has a total material thickness that is smaller than 7 mm and comprises at least one nonwoven fabric component and at least one foam material component, which are connected to each other, wherein the nonwoven fabric component comprises at least one binder fiber having a melting temperature greater than 150° C., wherein the nonwoven fabric component comprises at least one functional fiber featuring a linear mass density value of less than or equal to 50 dtex.

From DE 94 15 040 U1 a textile composite material for lamination is already known, which comprises a goods side which is close to a body and is made of a textile surface implementation and consists of one or several layers, wherein at least one of said layers is embodied of conductive hollow fibers, and is made of a spacer adjacent to said textile surface implementation, which is made of an open-cell foam, wherein the textile surface implementation arranged on the goods side which is close to a body is made of a nonwoven material. A total material thickness of the textile composite material for lamination is smaller than 7 mm. The conductive fibers are embodied as microfilaments. The goods side which is close to a body further comprises suctionable fibers, which are made of cotton, rayon or polyester-rayon mixtures and have a melting temperature greater than 150° C.

From EP 1 039 005 A1 a synthetic leather is already known, which comprises a nonwoven fabric component containing 30-95 percent by weight of hollow fibers and 5-70 percent by weight of non-hollow fibers, and comprises a porous cover layer. The hollow fibers and the non-hollow fibers are made of polyethylene terephthalate.

From US 2004/103970 A1 a nonwoven fabric is already known, which comprises 10-50 percent by weight of hollow fibers as functional fibers made of polyethylene terephthalate (PET) with a linear mass density value of 2-18 den and bicomponent binder fiber made of polyethylene/polypropylene, polyethylene/polyester, polypropylene/polyester, copolyester/PET, Nylon 6/Nylon 6,6 or Nylon 6/PET.

The objective of the invention is in particular to render a generic textile composite material for lamination available which allows advantageous processability, in particular time-saving processability. The objective is achieved, according to the invention, by the features of claim 1 while advantageous implementations and further developments of the invention may become apparent from the subclaims.

ADVANTAGES OF THE INVENTION

The invention is based on a textile composite material for lamination, in particular a textile composite material for lamination of a seat cover, with a total material thickness which is smaller than 7 mm, and with at least one nonwoven fabric component and with at least one foam material component which is connected to the nonwoven fabric component, wherein the nonwoven fabric component comprises at least one binder fiber having a melting temperature that is greater than 150° C., wherein the nonwoven fabric component comprises at least one functional fiber having a linear mass density value smaller than or equal to 50 dtex, wherein the functional fiber is embodied as a hollow fiber.

It is proposed that the nonwoven fabric component comprises a plurality of binder fibers and a plurality of functional fibers, which are mixed up with each other, wherein the binder fibers and/or the functional fibers are present as spinning fibers or as filaments, wherein, due to being mixed up with each other, the binding fibers and/or the functional fibers of the nonwoven fabric component are interconnected via a form-fit connection, via cohesion and/or via adhesion, wherein, for implementing the nonwoven fabric component, the binder fibers and/or the functional fibers are arranged in an oriented fashion or in a tangled fashion, wherein the nonwoven fabric component and the foam material component are connected to each other mechanically, wherein the nonwoven fabric component and the foam material component are needled with each other, wherein a holding force between the nonwoven fabric component and the foam material component, which acts counter to a foam-nonwoven separating force, is greater than 1 N, and wherein the binder fiber has a melting temperature equivalent to a value between 160 C and 190 C. Preferably the binder fiber is embodied as a melt fiber, which is configured to serve, due to partial or entire melting, as an adhesive means for connecting a further component or for bonding individual fibers of the nonwoven fabric component to each other. "Configured" is in particular to mean specifically designed and/or specifically equipped. By an element and/or a unit being configured for a certain function is in particular to be understood that the element and/or the unit fulfill/fulfills and/or implement/implements said certain function in at least one application state and/or operating state, or that the element and/or the unit are/is specifically designed to fulfill said certain function. The binder fiber has in particular a linear mass density value which is greater than 1 dtex, is preferably greater than 5 dtex and is particularly preferably smaller than 15 dtex. Especially preferentially the binder fiber has a linear mass density value which is equivalent to a value between 1 dtex and 9 dtex. Preferably the binder fiber has a melting temperature which is greater than 160° C. and is especially preferentially equal to or smaller than 200° C. The binder fiber is preferably configured as a connecting element of the nonwoven fabric component which connects at least one further material, in particular an adhesive web, to the nonwoven fabric component by substance-to-substance bond, in particular subsequently to a heating process. Herein the further material is embodied, for example, as a textured material, as a warp-knit fabric, as a further nonwoven fabric component, as a knitted material or such like. In a production process a thermal activation of the binder fiber is preferably effected in an oven. In this way the binder fiber establishes a thermal bond with fibers of the further material, wherein the non-melting fibers of the further material are adhesively bondable to the melted binder fiber. The material composite of the further composite and at least the nonwoven fabric component preferably stays resilient and stretchable in itself.

The nonwoven fabric component preferentially comprises, in addition to the at least one binder fiber (melt fiber), at least one functional fiber. Preferably the functional fiber is embodied as a polyester fiber, in particular as a polyethylene terephthalate fiber. It is, however, also conceivable that the functional fiber features a different implementation that is deemed expedient by someone skilled in the art, e.g. an implementation as a polyamide fiber, as a polyolefin fiber, as a polyacrylonitrile fiber, as a polyvinylchloride fiber, as a polyvinyl alcohol fiber, as a polyvinylidene fiber, as a polytetrafluoroethylene fiber, as a polyurethane fiber, or such like. The functional fiber herein in particular has a linear mass density value which is greater than 1 dtex, is preferably greater than 15 dtex and is especially preferentially smaller than 30 dtex. Very particularly preferably the functional fiber has a linear mass density value which is equivalent to a value between 1.5 dtex and 24 dtex. Preferably the functional fiber has a linear mass density value that is smaller than 40 dtex and is especially preferentially smaller than 30 dtex. Particularly preferably the functional fiber has a linear mass density value that is equivalent to a value of a value range from 1.5 dtex to 24 dtex. Advantageously an open-pore nonwoven fabric component can be implemented. This allows advantageously realizing a breathable nonwoven fabric component.

Preferably the functional fiber has a high resiliency capability. For this purpose the functional fiber is preferentially embodied in a spirally crimped fashion. Particularly preferably the nonwoven fabric component comprises a plurality of binder fibers and a plurality of functional fibers, which are mixed up with each other. Herein the binder fibers and/or the functional fibers may be embodied as spinning fibers (staple fibers) or as filaments (continuous fibers). Due to mix-up, the binder fibers and/or the functional fibers of the nonwoven fabric component are preferably interconnected via a form-fit connection (by interlacing), via cohesion and/or via adhesion. For implementing the nonwoven fabric component, the binder fibers and/or the functional fibers may be arranged in an orientated fashion or in a tangled fashion. The nonwoven fabric component has in particular a basis weight which is greater than 30 g per m$^2$, is preferably greater than 60 g per m$^2$ and is especially preferentially smaller than 550 g per m$^2$. The nonwoven fabric component has particularly preferably a basis weight which is equivalent to a value of a value range from 50 g per m$^2$ to 500 g per m$^2$.

The foam material component is preferably embodied as a polyurethane-polyether foam or as a polyurethane-polyester foam, in particular as a polyurethane-polyether cut foam or as a polyurethane-polyester cut foam. It is however also conceivable that the foam material component features another implementation that is deemed expedient by someone skilled in the art, in particular another implementation deemed expedient by someone skilled in the art as a foam having a textile character, which is soft-elastic, is rollable and may feature high resiliency forces as well as a preferably high air-permeability (e.g. reticulate foams).

The textile composite material for lamination preferentially has a total material thickness which is smaller than 7 mm. In particular, the textile composite material for lamination has a total material thickness which is greater than 0.9 mm. Especially preferentially the textile composite material for lamination has a total material thickness equivalent to a value between 1 mm and 6 mm. Preferably the total material thickness of the textile composite material for lamination consists least of a maximum nonwoven fabric thickness of the nonwoven fabric component and a maximum foam material thickness of the foam material component.

Preferably the nonwoven fabric component comprises at least a portion of functional fibers which are embodied as hollow fibers and a portion of functional fibers which are not embodied as hollow fibers. The term "hollow fiber" is here in particular to define a fiber comprising at least one hollow space, in particular a fiber which, viewed along a longitudinal axis of the fiber, comprises at least one hollow space extending at least substantially along a total length of the fiber which, viewed at least along a circumferential direction running about the longitudinal axis of the fiber, is encompassed by at least one envelope of the fiber. The envelope of the fiber may herein encompass the hollow space in particular in an annulus-shaped fashion, in a trilobal fashion, in a polygonal fashion or such like. Herein the functional fiber which is embodied as a hollow fiber preferably comprises a hollow space portion of in particular at least more than 1%, preferably at least more than 5% and especially preferentially at least more than 8%, with respect to a total volume portion of the hollow fiber. Very particularly preferably the functional fiber which is embodied as a hollow fiber has a hollow space portion of less than 15%, in particular in a 10% range, with respect to a total volume portion of the hollow fiber.

By means of the implementation according to the invention, particularly preferably a nonwoven fabric component with a spirally crimped fiber can be implemented. Furthermore advantageously a textile composite material for lamination may be rendered available which allows an advantageous processability, in particular time-saving processability. Advantageously a processability can be rendered possible, in particular contiguous heating for melting at least the binder fiber, in particular during a production process of the textile composite material for lamination, which may be carried out independently from a thickness of the textile composite material for lamination—whether thick or thin—with a constant temperature setting. This advantageously allows a short machine set-up period or even allows dispensing with a machine set-up period. Moreover high processing velocity may be advantageously rendered possible, in particular in case of a thin textile composite material for lamination, as an increased processing temperature advantageously allows accelerated heating of the textile composite material for lamination, in particular the thin textile composite material for lamination. As a result of this, time-saving when processing the textile composite material for lamination may advantageously be rendered possible.

Especially preferentially the binder fiber has a melting temperature equivalent to a value between 160° C. and 190° C. It is however also conceivable that in an alternative embodiment the binder fiber has a melting temperature exceeding 220° C. Via the implementation according to the invention, in a production process a temperature setting used for heating a textile composite material for lamination with a maximum total material thickness of more than 7 mm may be applied for heating a textile composite material for lamination according to the invention.

It is also proposed that the foam material component has a maximum foam material thickness which is smaller than 5 mm. In particular, the foam material component has a maximum foam material thickness which is smaller than 3.5 mm, preferably smaller than 3.1 mm and is particularly preferably greater than 0.9 mm. Especially preferentially the foam material component has a maximum foam material thickness equivalent to a value of a value range from 1 mm to 3 mm. By means of the implementation according to the invention, it is advantageously achievable that the foam material component allows quick heating up of an additionally attached adhesive web, wherein a high heat flow is realizable between the foam material component and the nonwoven fabric component, due to a thin implementation of the foam material component.

It is moreover proposed that the nonwoven fabric component has a maximum nonwoven fabric thickness which is smaller than 5 mm. In particular, the nonwoven fabric component has a maximum nonwoven fabric thickness which is smaller than 3.5 mm, preferably smaller than 3.1 mm, and is especially preferentially greater than 0.9 mm. Very particularly preferably the nonwoven fabric component has a maximum nonwoven fabric thickness equivalent to a value of a value range from 1 mm to 5 mm. Preferably the textile composite material for lamination has a proportion of a maximum foam material thickness of the foam material component to a maximum nonwoven fabric thickness of the nonwoven fabric component which is at least greater than or equal to 1. It is however also conceivable that the textile composite material for lamination has a proportion of a maximum foam material thickness of the foam material component to a maximum nonwoven fabric thickness of the nonwoven fabric component which is at least smaller than or equal to 1. A "maximum nonwoven fabric thickness of the nonwoven fabric component" is herein in particular to mean a maximum extension of the nonwoven fabric component, viewed along a direction running at least substantially perpendicularly to a main extension surface of the nonwoven fabric component, in particular at least substantially perpendicularly to the connection surface of the foam material component, which is embodied in particular by at least 70%, preferably by at least 80% and especially preferentially by at least 90% of a total number of interconnected fibers of the nonwoven fabric component, wherein in particular an entirety of the interconnected fibers, viewed in a cross section, form a polygonal shape, e.g. a rectangle, a square, or the like. Herein in particular single fibers extending beyond the polygonal shape will not be considered for determining the maximum nonwoven fabric thickness of the nonwoven fabric component. The term "substantially perpendicularly" is herein in particular to mean an orientation of a direction with respect to a reference direction, the direction and the reference direction including a 90°-angle, in particular when viewed in a plane, and the angle having a maximum deviation of in particular less than 8°, advantageously less than 5° and especially advantageously less than 2°. The implementation according to the invention advantageously allows fast spreading of heat through the nonwoven fabric component and thus through the binder fibers of the nonwoven fabric component.

Furthermore it is proposed that the foam material component has a volumetric weight which is greater than 10 kg per m$^3$. Preferably the foam material component has a volumetric weight which is greater than 15 kg per m$^3$ and is particularly preferably smaller than 100 kg per m$^3$. Very particularly preferably the foam material component has a volumetric weight which is equivalent to a value of a value range from 20 kg per m$^3$ to 90 kg per m$^3$. The implementation according to the invention advantageously allows rendering available a textile composite material for lamination having advantageous cushioning characteristics in addition to an advantageous processability.

By "connected to each other mechanically" is here in particular a form-fit and/or force-fit connection between at least two elements to be understood, in particular a form-fit and/or force-fit connection between the nonwoven fabric component and the foam material component. Preferably the nonwoven fabric component and the foam material component are connected to each other mechanically, without a substance-to-substance bond. Especially preferably herein fibers of the nonwoven fabric component engage into the foam material component. Preferably the textile composite material for lamination is configured to at least partially implement a seat cover, in particular a motor vehicle seat cover.

Advantageously the nonwoven fabric component and the foam material component are needled with each other, wherein at least more than 5% of a total connecting surface of the foam material component are pierced by fibers of the nonwoven fabric component. Especially advantageously it is proposed that the nonwoven fabric component and the foam material component are needled with each other with at least more than 15% of the total connecting surface of the foam material component being pierced by fibers of the nonwoven fabric component. Preferably fibers of the nonwoven fabric component extend into the foam material component on at least 15% of the connecting surface of the foam material component, in particular distributed over the total connecting surface, along a direction extending at least substantially transversely to the connecting surface of the foam material component. Preferentially the fibers piercing the connecting surface of the foam material component are arranged in such a way that they are at least substantially homogeneously distributed on the connecting surface of the foam material component. "At least substantially transversely'" is herein in particular to mean an orientation of a direction and/or of an axis with respect to a reference direction and/or a reference axis, wherein the orientation of the direction and/or of the axis is at least different from an at least substantially parallel orientation with respect to the reference direction and/or to the reference axis, in particular askew or perpendicularly to the reference direction and/or to the reference axis.

The term "needled" is herein in particular intended to define a mechanical connection between the nonwoven fabric component and the foam material component, wherein, in a state when the nonwoven fabric component is connected to the foam material component, at least one fiber, in particular a plurality of fibers, of the nonwoven fabric component at least partly extends/extend into the foam material component. A "connecting surface of the foam material component" is here in particular to mean a total surface of the foam material component adjoining the nonwoven fabric component in a state when connected to the nonwoven fabric component, in particular a surface of the foam material component which is projected into a projection plane. Preferentially the nonwoven fabric component and the foam material component are connected to each other via a needling process. Fibers of the nonwoven fabric component are thus preferably needled into the foam material component. Advantageously additional glue may be dispensed with. Advantageously a mechanical hold is established between the nonwoven fabric component and the foam material component, wherein in particular the binder fibers protruding from the foam material component subsequently to a needling are configured to be melted as well as adhesively bonded with an adhesive web which is arranged on a side of the foam material component facing away from the nonwoven fabric component, and which is configured to be connected, for example, to a leather material.

Preferably the nonwoven fabric component and the foam material component are needled with each other, wherein per 1 cm$^2$ of the connecting surface of the foam material component at least two fibers of the nonwoven fabric component enter into the foam material component. In particular, per 1 cm$^2$ of the connecting surface of the foam material component at least three fibers of the nonwoven fabric component, preferably at least five fibers of the nonwoven fabric component and particularly preferably at least ten fibers of the nonwoven fabric component enter into the foam material component. Very especially preferentially, per 1 cm² of the connecting surface of the foam material component more than ten fibers, in particular at least 20 to 300 fibers, of the nonwoven fabric component enter into the foam material component. The phrasing "enter into the foam material component" is here in particular to mean an arrangement of fibers of the nonwoven fabric component with respect to the foam material component wherein, in a connected state of the nonwoven fabric component and the foam material component, the fibers of the nonwoven fabric component extend, starting from the nonwoven fabric component, into the foam material component.

In particular, the nonwoven fabric component and the foam material component are needled with each other, wherein at least a large portion of fibers of the nonwoven fabric component entering into the foam material component extend into the foam material component at least by up to 50% of a maximum foam material thickness of the foam material component. A "large portion of fibers entering into the foam material component" is herein in particular to mean at least more than 20%, preferably more than 30% and particularly preferably more than 50% of a total number of fibers of the nonwoven fabric component entering into the foam material component. It is however also conceivable that single fibers of the nonwoven fabric component extend into the foam material component farther than by 50% of the maximum foam material thickness of the foam material component, or fully penetrate the foam material component. By the phrasing "extend into the foam material component at least by up to 50% of a maximum foam material thickness of the foam material component" is herein in particular to be understood that the fibers of the nonwoven fabric component have, starting from a peripheral region of the nonwoven fabric component, a protrusion extension, in particular a protrusion extension into the foam material component, which is equivalent to at least 50% of a maximum foam material thickness of the foam material component.

By means of the implementation according to the invention, a particularly advantageous and secure connection between the nonwoven fabric component and the foam material component can be rendered possible. Advantageously a high level of stability of the foam material component can be kept up. Thus an elasticity and a durability of the foam material component may advantageously be kept up. Moreover a surface tension of the foam material component may advantageously be broken by a needle entering and/or penetrating during the needling process, for the purpose of allowing an advantageous adaptation of the textile composite material for lamination, in particular of the foam material component, to a shape of an object on which the textile composite material for lamination is arrangeable.

A holding force between the nonwoven fabric component and the foam material component, which acts counter to a foam-nonwoven separating force, is greater than 1 N, in particular due to a form-fit and/or force-fit connection between the fibers of the nonwoven fabric component and the foam material component. By a "foam-nonwoven separating force" is here in particular a force to be understood which acts onto the textile composite material for lamination in at least one case of a load and which is capable of inducing a connection between the nonwoven fabric component and the foam material component to be separated, in particular when viewed along a direction extending at least substantially perpendicularly to the connecting surface of the foam material component. In particular, a holding force between the nonwoven fabric component and the foam material component, which acts counter to a foam-nonwoven separating force, is smaller than 1 kN, is preferably smaller than 0.8 kN and is especially preferentially greater than 10 N, in particular smaller than 10 N and greater than 2 N. A holding force between the nonwoven fabric component and the foam material component, which acts counter to a foam-nonwoven separating force, herein preferably results from an engagement of the fibers of the nonwoven fabric component in the foam material component, in particular from a form-fit and/or force-fit connection between the fibers of the nonwoven fabric component and the foam material component. The implementation according to the invention advantageously allows counteracting or at least substantially preventing an undesired separation of the nonwoven fabric component and the foam material component.

Furthermore a seat cover is proposed, which is implemented at least partly by the textile composite material for lamination.

The textile composite material for lamination according to the invention and/or the seat cover according to the invention are/is herein not to be restricted to the application and implementation form described above. In particular, the textile composite material for lamination according to the invention and/or the seat cover according to the invention may, for fulfilling a functionality herein described, comprise a number of respective elements, structural components and units as well as method steps which differs from a number herein mentioned. Moreover, regarding the value ranges indicated in the present disclosure, values within the named limits are to be considered disclosed and applicable according to requirement.

DRAWINGS

Further advantages may be gathered from the following description of the drawings. In the drawings an exemplary embodiment of the invention is shown. The drawings, the description and the claims contain a plurality of features in combination. Someone having ordinary skill in the art will purposefully also consider the features individually and will find further expedient combinations.

It is shown in.

DETAILED DESCRIPTION

Figure 1:
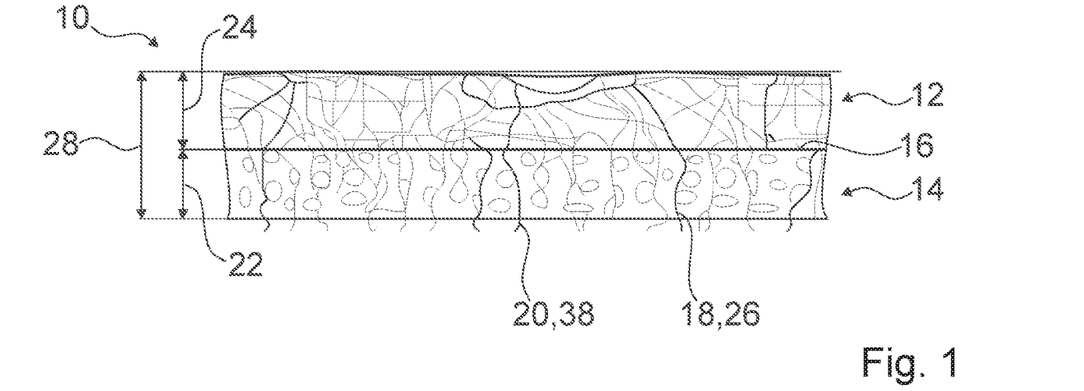
FIG. 1 a sectional view of a textile composite material for lamination according to the invention, in a schematic presentation, FIG. 2 a sectional view of a textile composite material for lamination according to the invention, with a leather of a seat cover according to the invention arranged on the textile composite material for lamination according to the invention, in a schematic presentation, and FIG. 3 a sectional view of a textile composite material for lamination according to the invention, with a leather arranged on the textile composite material for lamination according to the invention, and with a leather reinforcement of a seat cover according to the invention, which is arranged on the leather, in a schematic presentation.

FIG. 1 shows a textile composite material for lamination 10 with a total material thickness 28 which is smaller than 7 mm, and with at least one nonwoven fabric component 12 and with at least one foam material component 14 which is connected to the nonwoven fabric component 14. Herein the nonwoven fabric component 12 and the foam material component 14 are connected to each other mechanically.

The nonwoven fabric component 12 and the foam material component 14 are needled with each other, wherein at least more than 5% of a total connecting surface 16 of the foam material component 14 are pierced by fibers 18, 20 of the nonwoven fabric component 12. Preferably the nonwoven fabric component 12 and the foam material component 14 are needled with each other in such a way that at least more than 15% of the total connecting surface 16 of the foam material component 14 are pierced by fibers 18, 20 of the nonwoven fabric component 12. Thus per 1 cm$^2$ of the connecting surface 16 of the foam material component 14 at least two fibers 18, 20 of the nonwoven fabric component 12 enter into the foam material component 14. Preferably per 1 cm$^2$ of the connecting surface 16 of the foam material component 14 at least ten fibers 18, 20, in particular between 20 and 300 fibers 18, 20 of the nonwoven fabric component 12 enter into the foam material component 14. It is however also conceivable that per 1 cm$^2$ of the connecting surface 16 of the foam material component 14 more than 10, in particular more than 300 fibers 18, 20 of the nonwoven fabric component 12 enter into the foam material component 14.

Furthermore, at least a large portion of the fibers 18, 20 of the nonwoven fabric component 12 entering into the foam material component 14 extend into the foam material component 14 at least by up to 50% of a maximum foam material thickness 22 of the foam material component 14. It is however also conceivable that single fibers 18, 20 or alternatively the large portion of the fibers 18, 20 completely penetrate the foam material component 14. It is moreover conceivable that single fibers 18, 20 or alternatively the large portion of the fibers 18, 20 extend into the foam material component 14 farther than by 50% of the maximum foam material thickness 22 of the foam material component 14, or that single fibers 18, 20 or alternatively the large portion of the fibers 18, 20 extend into the foam material component 14 by less than 50% of the maximum foam material thickness 22 of the foam material component 14. A proportion of the maximum foam material thickness 22 of the foam material component 14 to a maximum nonwoven fabric thickness 24 of the nonwoven fabric component 12 is at least greater than or equal to 1. Herein the foam material component 14 has a maximum foam material thickness 22 which is smaller than 4 mm. In particular, the foam material component 14 has a maximum foam material thickness 22 which is smaller than 4 mm. In particular, the nonwoven fabric component 12 has a maximum nonwoven fabric thickness which corresponds to a value of a value range between 1 and 3 mm. The nonwoven fabric component 12 has a maximum nonwoven fabric thickness 24 which corresponds to a value of a value range between 1 and 3 mm. The total material thickness 28 of the textile composite material for lamination 10 is herein implemented at least by the maximum foam material thickness 22 of the foam material component 14 and the maximum nonwoven fabric thickness 24 of the nonwoven fabric component 12.

The nonwoven fabric component 12 and the foam material component 14 are moreover needled with each other in such a way that a holding force between the nonwoven fabric component 12 and the foam material component 14, which acts counter to a foam-nonwoven separating force, is greater than 1 N. This is achieved by a needling procedure of the nonwoven fabric component 12 and the foam material component 14 in which the fibers 18, 20 of the nonwoven fabric component 12 are needled into the foam material component 14 by means of a needling machine (not shown in detail), resulting in the fibers 18, 20 of the nonwoven fabric component 12 establishing a form-fit and/or force-fit connection with the foam material component 14. The nonwoven fabric component 12 is thus connected to the foam material component 14 in a non-detachable, i.e. permanent, fashion. The foam material component 14 herein has a volumetric weight which is greater than 10 kg per m$^3$. The nonwoven fabric component 12 has a basis weight which is greater than 45 g per m$^2$.

The nonwoven fabric component 12 further comprises at least one functional fiber 26, which has a linear mass density value smaller than or equal to 50 dtex. The functional fiber 26 is herein implemented by one of the fibers 18, 20 of the nonwoven fabric component 12. The functional fiber 26 is embodied as a hollow fiber. Herein the functional fiber 26 may have any cross section deemed expedient by someone having ordinary skill in the art, e.g. a star-shaped cross section, a tetragonal cross section, a trilobal cross section, a horseshoe-shaped cross section, an annulus-shaped cross section, or such like. All in all, the nonwoven fabric component 12 comprises a plurality of functional fibers 26, which have a linear mass density value smaller than or equal to 50 dtex and are in particular embodied as hollow fibers.

Beyond this, the nonwoven fabric component 12 comprises at least one binder fiber 38 (melt fiber) having a melting temperature greater than 150° C. Herein the melting temperature of the at least one binder fiber 38 is smaller than 220° C. The melting temperature of the binder fiber 38 is equivalent to a value of a value range from 160° C. to 180° C. In particular, the melting temperature of the binder fiber 38 is equivalent to a value of a value range between 160° C. and 180° C. The binder fiber 38 is implemented by one of the fibers 18, 20 of the nonwoven fabric component 12. All in all, the nonwoven fabric component 12 comprises a plurality of binder fibers 38. Due to being mixed up, the binder fibers 38 and/or the functional fibers 26 of the nonwoven component 12 are interconnected with each other via a form-fit connection (by interlacing), via cohesion and/or via adhesion.

Herein the binder fibers 38 and/or the functional fibers 26 may be arranged in an oriented fashion and/or in a tangled fashion.

Figure 2:
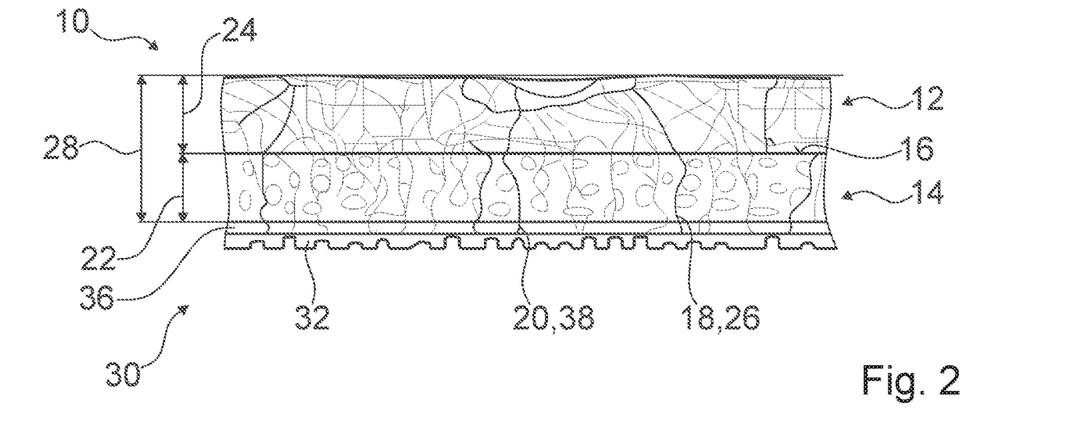
Figure 3:
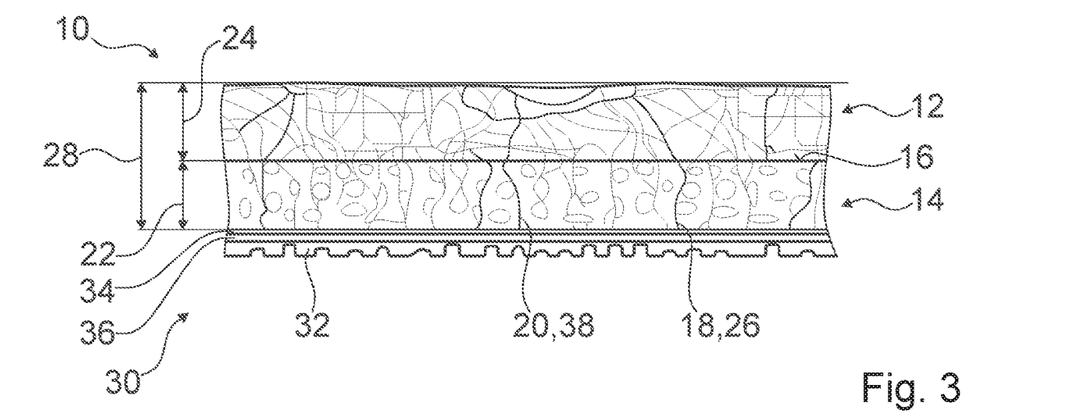

The textile composite material for lamination 10 is embodied as a textile composite material for lamination of a seat cover. The textile composite material for lamination 10 is thus configured to at least partly implement a seat cover 30, in particular a motor vehicle seat cover. For this purpose the textile composite material for lamination 10 is connectable to at least one further material 32, e.g. a textile, a leather, a synthetic leather or the like (FIGS. 2 and 3). The seat cover 30 is thus implementable at least via connecting the textile composite material for lamination 10 and the further material 32. In the exemplary embodiment shown in FIG. 2, the further material 32 is embodied as a leather which is connectable to the textile composite material for lamination 10 for implementing the seat cover 30. For this purpose the further material 32 is arrangeable on a side of the foam material component 14 facing away from the nonwoven fabric component 12. For connecting the textile composite material for lamination 10 and the further material 32, the textile composite material for lamination 10 or the seat cover 30 comprises at least one connection component 36. The connection component 36 is embodied as an adhesive component. Herein it is conceivable that the connection component 36 is embodied as an adhesive nonwoven/adhesive web, as a self-adhesive glue, in particular as a self-adhesive, pressure-sensitive glue, or the like. In an implementation of the connection component 36 as an adhesive nonwoven/adhesive web the connection component 36 features a reticulate structure and is in particular embodied of a material similar or identical to the binder fiber 38, wherein the connection component 36 has a melting point which corresponds to a value of a value range from 50° C. to 140° C., preferably of a value range from 90° C. to 100° C. It is herein also conceivable that the connection component 36 is embodied, for example, as a co-polyamide.

In an alternative embodiment of the further material 32 as a textile or as a synthetic leather, the connection component 36 is embodied at least partly in a one-part implementation with the foam material component 14, or the connection component 36 is embodied as an additional foam material component, wherein the connection component 36 is in both implementations flame-laminatable. In an implementation of the connection component 36 as an additional foam material component, advantageously a lost-foam procedure is applicable, which is already known to someone skilled in the art. Herein the connection component 36 is arrangeable on the foam material component 14 via flame-lamination and the further material 32 is arrangeable, via flame-lamination, on the connection component 36, which is already arranged on the foam material component 14. Subsequently to the flame lamination, the connection component 36, which is embodied as an additional foam material component, is hence present just as a thin adhesive layer. Advantageously an original thickness of the textile composite material for lamination 10 may be at least substantially maintained. It is furthermore also conceivable that, alternatively or additionally, glue points and/or glue powder, melt-print procedures, hotmelt glues, adhesive foils or other adhesive-bonding measures or adhesive-bonding procedures, in particular hot-glue or cold-glue procedures, which are deemed expedient by someone skilled in the art, advantageously maintaining a textile character of the textile composite material for lamination 10, are used for connecting the further material 32 to the foam material component 14.

The textile composite material for lamination 10 is, for example, connectable to the further material 32 via a flatbed laminating plant or via a leather fixation plant. Herein a processing temperature for connecting the textile composite material for lamination 10 and the further material 32 can be kept advantageously low, in particular in case of the connection component 36 being embodied as an adhesive nonwoven/adhesive web.

In FIG. 3 the seat cover 30 comprises at least one reinforcing material 34, in addition to the textile composite material for lamination 10 and the further material 32. The reinforcing material 34 is herein configured for reinforcing the further material 32. In the exemplary embodiment of the textile composite material for lamination 10 shown in FIG. 3, the reinforcing material 34 is thus embodied as a leather-reinforcing material. It is however also conceivable that the reinforcing material 34 features a different implementation deemed expedient by someone skilled in the art, in particular an implementation depending on an implementation of the further material 32. The reinforcing material 34 is arranged between the textile composite material for lamination 10 and the further material 32. Herein the reinforcing material 34 is arranged on a side of the foam material component 14 facing away from the nonwoven fabric component 12, in particular between the foam material component 14 and the connection component 36. It is however also conceivable that the reinforcing material 34 features a different arrangement which is deemed expedient by someone having ordinary skill in the art. The reinforcing material 34 may be embodied as a textured material, as a warp-knit, as a knitted material, as a lattice, or the like for a leather support. Preferably the reinforcing material 34 is fixable with the foam material component 14 by means of an adhesive web (not shown in detail). Thus a leather stretching in case of a load is advantageously at least substantially preventable or at least reducible. Moreover, specially strained regions of the seat cover 30, e.g. an outlet point of a lateral airbag, may be provided with appropriate reinforcements. Furthermore, by an adequate choice of the reinforcing material 34, at least a stretching characteristic, a material characteristic, in particular a maximum tensile force to be endured, etc. of the textile composite material for lamination 10 is modifiable. In case of an alternative implementation of the further material 32 as a textile or as a synthetic leather, which is not shown here in detail, it is also conceivable that, in addition to the connection component 36, a chemical binding agent (not shown here in detail) is provided, e.g. a glue, which is arrangeable on the further material 32 and/or on the textile composite material for lamination 10. Said binding agent may advantageously at least substantially avoid or at least reduce a fiber dust of fibers of the further material 32 and/or an adhesion of fiber material of the nonwoven fabric component 12 on the further material 32, in particular subsequently to a curing process of the binding agent. Advantageously a fluff protection is achievable.

The textile composite material for lamination 10 advantageously allows a smooth, fold-free arrangement of the textile composite material for lamination 10 even on difficult seat contours of a seat, in particular of a motor vehicle seat, e.g. on a convex-concavely implemented cushioning of a seat, in a heavily strained region of a seat, e.g. a lateral wing of an access side of a seat, etc. Beyond this, the textile composite material for lamination 10 is advantageously highly drapeable in minute radii, e.g. in case the textile composite material for lamination 10 is arranged on a seat in which the textile composite material for lamination 10 is formed convex in a partial region of the textile composite material for lamination 10 and is formed concave in a further partial region of the textile composite material for lamination 10 which directly abuts the partial region. Furthermore the textile composite material for lamination 10 is difficult to ignite in accordance with FMVSS 302, or ISO 3795 respectively. Furthermore, all relevant documents of the automobile industry are taken into consideration, e.g. requirements regarding emission/fogging/smell, the end-of-life vehicle regulation, etc.

The invention claimed is:
1. A textile composite material for lamination, with a total material thickness that is smaller than 7 mm, comprising
   a nonwoven fabric component,
   a foam material component, which is connected to the nonwoven fabric component by needling, and
   an adhesive web, which is arranged on a side of the foam material component facing away from the nonwoven fabric component and which is configured to be connected to a leather material or reinforcing material, wherein
   the nonwoven fabric component comprises a plurality of binder fibers and a plurality of functional fibers, which are mixed up with each other,
   the binder fibers and/or the functional fibers are present as spinning fibers or as filaments, due to being mixed up with each other, the binding fibers and/or the functional fibers of the nonwoven fabric component are interconnected via a form-fit connection, via cohesion and/or via adhesion, for implementing the nonwoven fabric component, the binder fibers and/or the functional fibers are arranged in an oriented fashion or in a tangled fashion, each functional fiber of the plurality of functional fibers of the nonwoven fabric component has a linear mass density between 1.5 dtex and 24 dtex, the functional fibers of the plurality of functional fibers are hollow fibers, a holding force between the nonwoven fabric component and the foam material component, which acts counter to a foam-nonwoven separating force, is greater than 1 N, each binder fiber of the plurality of binder fibers has a melting temperature between 160° C. and 190° C., each binder fiber of the plurality of binder fibers has a linear mass density between 1 dtex and 9 dtex, more than 5% of a total connecting surface of the foam material component being pierced by the plurality of binder fibers and the plurality of functional fibers of the nonwoven fabric component, and the connecting surface of the foam material component is a total surface of the foam material component adjoining the nonwoven fabric component in a state when the foam material component is connected to the nonwoven fabric component by needling, wherein at least single fibers of the plurality of binder fibers of the nonwoven fabric component fully penetrate the foam material component, the single fibers of the plurality of binder fibers that fully penetrate the foam material component protrude from the foam material component on a side of the foam material component facing away from the nonwoven fabric component subsequent to a needling and are thermally bonded as well as adhesively bonded with the adhesive web, the adhesive web is an adhesive nonwoven having a reticulate structure, and the adhesive nonwoven is in direct contact with the side of the foam material component facing away from the nonwoven fabric component.

2. The textile composite material for lamination according to claim 1, wherein the foam material component has a maximum foam material thickness which is smaller than 5 mm.

3. The textile composite material for lamination according to claim 1, wherein the nonwoven fabric component has a maximum nonwoven fabric thickness which is smaller than 5 mm.

4. The textile composite material for lamination according to claim 1, wherein the foam material component has a volumetric weight between 20 kg per m$^3$ and 90 kg per m$^3$.

5. A seat cover comprising:
the textile composite material for lamination according to claim 1, and
a further material, which is a textile, a leather or a synthetic leather,
wherein the further material is connected to the textile composite material for lamination, and
wherein the further material is arranged on the side of the foam material component of the textile composite material facing away from the nonwoven fabric component of the textile composite material.

6. The textile composite material for lamination according to claim 1, wherein the nonwoven fabric component has a basis weight that is smaller than 160 g per m$^2$.

7. The textile composite material for lamination according to claim 1, wherein more than 15% of the total connecting surface of the foam material component is pierced by the plurality of binder fibers and the plurality of functional fibers of the nonwoven fabric component.

8. The textile composite material for lamination according to claim 1, wherein the plurality of binder fibers and the plurality of functional fibers of the nonwoven fabric component extend into the foam material component by at least 50% of a maximum foam material thickness of the foam material component.

9. The textile composite material for lamination according to claim 1, wherein at least single fibers of the plurality of binder fibers and at least single fibers of the plurality of functional fibers of the nonwoven fabric component fully penetrate the foam material component.

10. The textile composite material for lamination according to claim 1, wherein, per 1 cm$^2$ of the connecting surface of the foam material component, at least 20 to 300 fibers of the plurality of binder fibers and the plurality of functional fibers of the nonwoven fabric component enter into the foam material component.

11. The textile composite material for lamination according to claim 1, wherein the plurality of functional fibers of the nonwoven fabric component have a linear mass density value between 5 dtex and 22 dtex.

12. The textile composite material for lamination according to claim 1, wherein the foam material component is a polyurethane-polyether foam or a polyurethane-polyester foam.

13. A textile composite material for lamination, with a total material thickness that is smaller than 7 mm, comprising:
a nonwoven fabric component;
a foam material component, which is connected to the nonwoven fabric component by needling; and
an adhesive web, which is arranged on a side of the foam material component facing away from the nonwoven fabric component and which is configured to be connected to a leather material or reinforcing material, wherein the nonwoven fabric component comprises a plurality of binder fibers and a plurality of functional fibers, which are mixed up with each other, the binder fibers and/or the functional fibers are present as spinning fibers or as filaments, due to being mixed up with each other, the binding fibers and/or the functional fibers of the nonwoven fabric component are interconnected via a form-fit connection, via cohesion and/or via adhesion, for implementing the nonwoven fabric component, the binder fibers and/or the functional fibers are arranged in an oriented fashion or in a tangled fashion, the plurality of functional fibers of the nonwoven fabric component have a linear mass density value smaller than or equal to 50 dtex, the plurality of functional fibers are hollow fibers, the plurality of binder fibers has a melting temperature between 160° C. and 190° C., a holding force between the nonwoven fabric component and the foam material component, which acts counter to a foam-nonwoven separating force, is greater than 1 N, at least single fibers of the plurality of binder fibers of the nonwoven fabric component fully penetrate the foam material component, the single fibers of the plurality of binder fibers that fully penetrate the foam material component protrude from the foam material component on the side of the foam material component facing away from the nonwoven fabric component subsequent to a needling and are thermally bonded as well as adhesively bonded with the adhesive web, the adhesive web is an adhesive nonwoven having a reticulate structure, the adhesive nonwoven is in direct contact with the side of the foam material component facing away from the nonwoven fabric component, and each hollow fiber of the plurality of functional fibers has a hollow-space portion between 1% and 15% with respect to a total volume portion of each hollow fiber.

14. The textile composite material for lamination according to claim 1, wherein each fiber of the plurality of functional fibers is a hollow fiber and has a hollow space portion of less than 15% with respect to a total volume portion of the hollow fiber.

15. The textile composite material for lamination according to claim 1, wherein the foam material component has a maximum foam material thickness, the nonwoven fabric component has a maximum nonwoven fabric thickness, the textile composite material for lamination has a proportion of the maximum foam material thickness to the maximum nonwoven fabric thickness, and the proportion is greater than or equal to 1.

* * * * *